Figure 1:
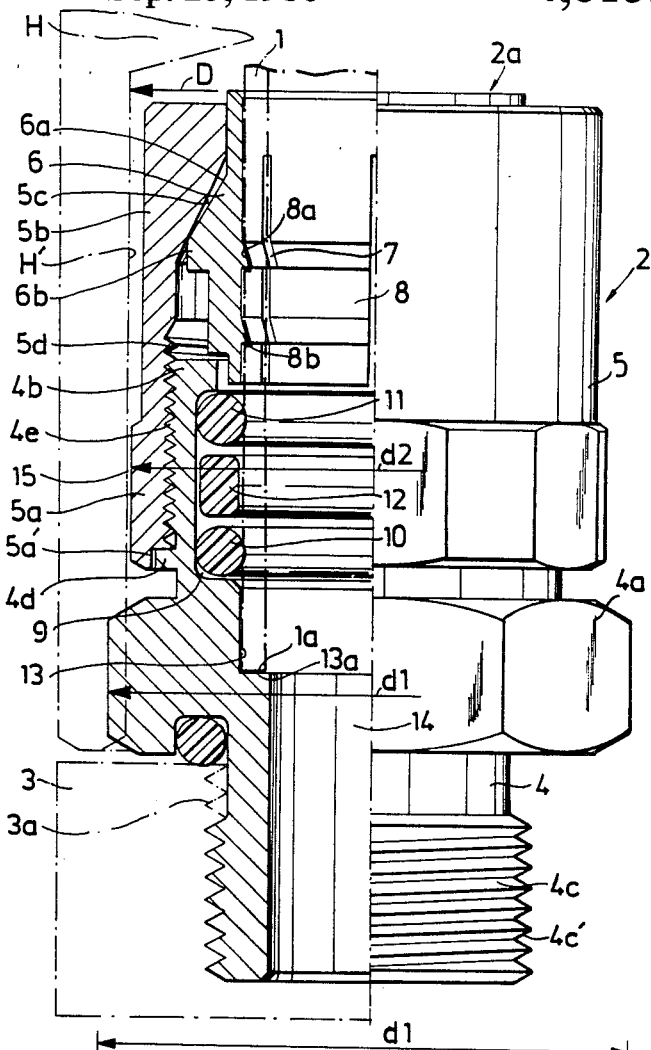

United States Patent [19]

Ekman

[11] Patent Number: 4,613,158
[45] Date of Patent: Sep. 23, 1986

[54] ARRANGEMENT FOR A COUPLING WITH A FIRST AND A SECOND COUPLING PART AND A METHOD FOR PRODUCTION OF THE COUPLING

[76] Inventor: Kjell R. Ekman, Aberenrain 43, 6340 Baar, Switzerland

[21] Appl. No.: 521,801

[22] Filed: Aug. 10, 1983

[30] Foreign Application Priority Data

Aug. 27, 1982 [SE] Sweden ................. 8204911

[51] Int. Cl.$^4$ ............................................. F16L 35/00
[52] U.S. Cl. ..................................... 285/3; 285/39; 285/249; 285/323; 285/339; 285/382.7
[58] Field of Search ............... 285/3, 4, 39, 243, 248, 285/249, 339, 323, 382.7, 158

[56] References Cited

U.S. PATENT DOCUMENTS

| | | | |
|---|---|---|---|
| 2,460,653 | 2/1949 | Raybould | 285/249 |
| 2,698,191 | 12/1954 | Samiran | 285/248 |
| 3,079,182 | 2/1963 | Appleton | |
| 4,063,760 | 12/1977 | Moreiras | 285/249 X |
| 4,475,748 | 10/1984 | Ekman | 285/3 |

Primary Examiner—Richard J. Scanlan, Jr.
Attorney, Agent, or Firm—Pollock, Vande Sande & Priddy

[57] ABSTRACT

A coupling unit comprising a first coupling part and a second coupling part. The second coupling part can be displaced longitudinally relative to the first coupling part by means of screw threads or the like. The first coupling part is equipped with a first nut-shaped section and the second coupling part with a second nut-shaped section. The second nut-shaped section has a cross-section measurement which allows passage of the internal surface of a tightening and/or loosening sleeve, when the latter is passed over the second nut-shaped section, to co-act with the first nut-shaped section.

9 Claims, 2 Drawing Figures

U.S. Patent    Sep. 23, 1986    4,613,158

ARRANGEMENT FOR A COUPLING WITH A FIRST AND A SECOND COUPLING PART AND A METHOD FOR PRODUCTION OF THE COUPLING

TECHNICAL FIELD

The present invention relates to an arrangement for a coupling unit with a first coupling part and a second coupling part which can be displaced longitudinally relative thereto by means of a screw thread or the like, the first coupling part comprising a first nut-shaped section and the second coupling part comprising a second nut-shaped section. The invention relates to a method for production of said coupling as well.

STATE OF THE ART

Coupling units are already known which serve as snap-coupling devices for elongated objects, such as hoses, pipes, duct, etc., one end of which is intended to be anchored by a simple push-in connection or so-called "plug-in" connection. One known coupling unit comprises an insertion sleeve which can be clamped tight by means of a clamping nut or a corresponding device which can be allotted various amounts of longitudinal displacement relative to the casing of the coupling unit and which, dependent on the extent of this longitudinal displacement, causes clamping to be effected more or less tightly around the end of the pipe or the like which has been pushed in. The insertion sleeve is equipped with internal retaining devices, preferably barb-shaped, which are designed to allow the said end to be pushed in easily but, after it has been pushed in, to co-act with the casing material on the end and thereby counteract any tendency for the end to be pulled out of the coupling unit. The insertion sleeve is slit in the longitudinal direction to enable it to clamp round the end involved. The known coupling unit is also equipped with sealing devices which for a seal between the coupling unit and the end so that medium or the like cannot pass through or between them or leak out via the coupling unit.

DESCRIPTION OF THE INVENTION

The Technical Problems

The coupling unit should also be equipped with a spanner or sleeve grip, preferably in the form of a nut-shaped section, so that the coupling unit, connecting device or the like can be securely fixed into an object to or from which the actual medium or the like is to be conducted via the coupling unit and the connected hose or the like. Secure fixing can be effected by means of a screw thread, bayonet fastening or the like provide on the coupling unit and arranged at the end of the coupling unit furthest away from the end with the insertion sleeve.

It would be conceivable to use a spanner or sleeve grip on the longitudinally displaceable nut for tightening the insertion sleeve and the coupling unit as a whole as well. However, there is a requirement for separate spanner and/or sleeve grips for the clamping nut and the coupling unit.

There is also a demand for producing the various parts of the coupling unit in as few working steps as possible, expecially in the case where, for example, the tightening nut is made of steel or the like, due to quality requirements.

A simplified assembly process which, for example, will allow the automatic assembly of the coupling unit as a whole is desirable in this connection. During such automatic assembly the coupling unit being thus finally assembled can be conveyed in a pipe or the like to a tightening station where a tightening tool co-acts with the coupling unit conveyed in this way.

The Solution

The present invention relates to the devising of an arrangement which solves the above problems, amongst others, and the feature which can be regarded as being primarily characteristic of the new arrangement is that the second nut-shaped section is made with a cross-section measurement which allows the passage of the internal surface of a tightening and/or loosening sleeve which is passed over the second nut-shaped section to co-act with the first nut-shaped section.

Amongst the further developments of the concept of the invention is the feature that the second nut-shaped section is located at the end of the second coupling part which will lie nearest to the first nut-shaped section. The latter section can be designed to allow the second coupling part to be tightened so that it rests against a snap-off rim situated on the first coupling part and/or so that it snaps off the said snap-off rim. The first nut-shaped section also enables the first coupling part to be tightened and/or loosened when the second coupling part has been joined onto the first coupling part, this tightening and/or loosening being intended to be effected into or out of an object, respectively.

In the further developments the second nut-shaped section and the other parts of the second coupling part are made from a single piece of a hard material, such as, for example, steel which may be a hexagonal material, for example, out of which the external and internal contours of the second coupling part are machined by turning. The shaping of the second nut-shaped section can be effected by machining over the corners to provide under-dimensioning relative to the inner wall of the sleeve which in this case preferably consists of a so-called twelve-sided sleeve.

The further improvements also cover the positioning of the first nut-shaped section on the first coupling part, and the shaping of the rest of this part. The second nut-shaped section is situated at the part of the second coupling part which co-acts with the said snap-off rim, so that there is a maximum thickness of the material at the said snap-off rim.

Advantages

According to the solutions described above a simple and rational method can be used for tightening the unit in an actual object, without having to make use of the clamping arrangement for the insertion sleeve. This means that, if so desired, the clamping arrangement can assume other functions in addition to the clamping function itself, such as an abutment function against a snap-off rim and/or the function of snapping-off the rim, situated on the first coupling part. The assembly of the unit can be effected via one end of the unit where the hose, duct or the like is pushed in to form a connection.

With the above proposals advantages are also achieved in the production of the parts of the coupling unit. The basic material may be a many-sided material, for such as hexagonal material, with the same dimensions for both the tightening nuts and the body of the coupling unit. The first nut section on the latter is left substantially unmachined, while the remaining section on the body is machined down by turning so that the desired external contours, with the snap-off rim amongst other things, are obtained. The internal contours of the body can be produced next. The external contours of the tightening nut on the associated second nut section and the otherwise planer cylindrical casing surface are accomplished by machining the tightening nut off at the corners on the second nut-shaped section Until its external dimensions are somewhat less, for example, 0.1 mm less, than the inscribed circle of the actual tightening sleeve, preferably a twelve-sided sleeve, and also machining away the remaining parts of the tightening nut until a smooth casing surface is obtained. Subsequently, the internal contours of the tightening nut can be produced. Naturally, it is possible to reverse the working steps so that, for example, the internal contours are produced first, etc. The process described here is particularly advantageous in the case where the relevant part or parts of the coupling unit are to be made of steel or some other similar material.

LIST OF FIGURES

Figure 2:
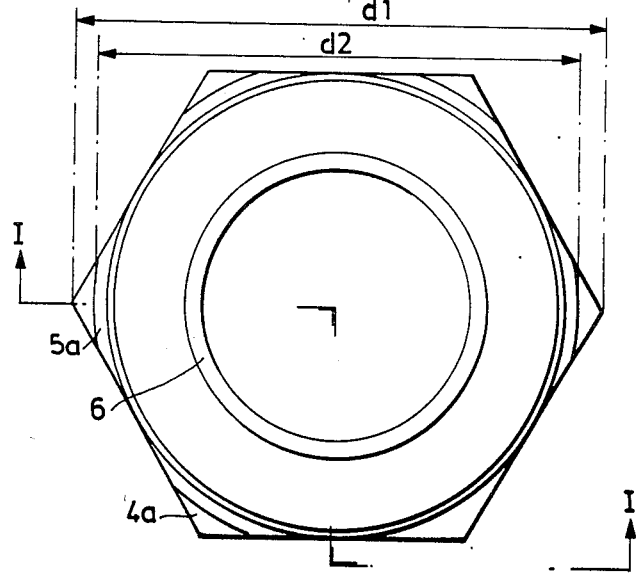

A preferred embodiment of an arrangement displaying the characteristics which are significant to the invention will be described below with reference to the accompanying drawing, in which FIG. 1 shows a partial longitudinal section of the coupling unit, and FIG. 2 shows the coupling unit of FIG. 1, viewed from the end. cl PREFERRED EMBODIMENT The coupling unit shown in FIGS. 1 and 2 constitutes a snap-coupling unit for a hose, pipe, duct, etc. which is designated by the numeral 1. The end of the elongated object in question is designed to be pushed into the coupling unit 2 via the first end 2a thereof. Furthermore, the coupling unit can form a coupling device for the end of a hose or the like, or a connecting device for the ends of two hoses; in the latter case the end 2a of the coupling unit is of double construction so that the two ends of the coupling unit look the same. A medium, pressure, optical beams, etc. may be conveyed further or supplied via the coupling unit and the attached hose, pipe, etc.

The embodiment shown in FIG. 1 is intended to represent a coupling device which can be fixed in an object designated by 3, which may form part of a system, such as a brake system, an optical system, etc. The object may also be constituted by a medium source, etc.

The coupling unit 2 comprises a first coupling part 4 and a second coupling part 5. The first coupling part has a first nut-shaped section 4a positioned on the central section of the first coupling part, viewed in the longitudinal direction. The first coupling part has a sleeve-shaped section 4b at its first end and a section 4c with a screw thread at its second end. The threaded section preferably bears an external thread 4c' by means of which the coupling unit 2 as a whole can be screwed securely into an internal thread 3a in the object 3. On the sleeve-shaped section the first coupling part 4 is provided with a snap-off rim 4d.

The second coupling part 5 is equipped with a second nut-shaped section 5a. The second nut-shaped section is located at the inner end of the second coupling part 5, i.e. the end which is nearest to the first nut-shaped section 4a. At the free end of the second coupling part the second nut-shaped section has an internal recess 5a' via which co-action can take place between the second coupling part 5 and the snap-off rim 4d on the first coupling part. The second coupling part also has a plane cylindrical external surface 5b which extends from the second nut-shaped section up to the outer end of the second coupling part.

The second coupling part is designed to function as a clamping device for an insertion sleeve 6 which amongst other things is made with an external tapered surface 6a, to form an external flange 6b. Furthermore, the second coupling part 5 is equipped with an internal tapered surface 5c which is designed to co-act with the insertion sleeve via the external flange 6b. The insertion sleeve 6 is provided with a number, preferably a considerable number, of longitudinally extending slits 7 to form a spring element on the insertion sleeve. Due to the construction of the coupling part 5 and the insertion sleeve 6 as shown here, the spring element can be forced in a radial direction according to the degree of relative longitudinal displacement between the first and the second coupling parts. The relative longitudinal displacement is effected expediently by means of screw threads 4e and 5d on the first and second coupling parts. The thread 4e forms an external thread on the sleeve-shaped section 4b and the thread 5d forms an internal thread which extends over half the interior of the second coupling part.

On its inner surface the spring element bears retaining devices 8a, 8b for the end 1. The retaining devices here are preferably barb-shaped and are designed so that they allow easy insertion of the end 1 into the coupling unit 2, but strive to penetrate into the material of the external surface of the end when the end is exposed to any tendency to pull it out of the coupling unit.

At the sleeve-shaped section 4b the first coupling part 4 is made with an internal cavity 9 for sealing devices 10 and 11 which are preferably formed by two conventional O-ring seals. The annular seals are separated in the cavity by a combined guiding and centring device 12. Preferably, the cavity 9 has a longitudinal extent which corresponds to the combined longitudinal extent of the elements 10, 11 and 12 when the sealing devices 10, 11 are also compressed by the hose or the like. Below the cavity 9 the first coupling part 4 has a further cavity 13 which continues via a shoulder 13a into a longitudinally extending passage 14 which emerges at the second end 4c of the first coupling part. The cavity 13 serves as a support for the free part of the end 1 of the hose or the like, and also closes it off. The shoulder 13a forms an abutment surface for the terminal edge 1a of the end 1. With the construction shown the mounting of the end 1 in the coupling unit 2 is extensive in the longitudinal direction, and is well centred.

According to the concept of the invention the first nut-shaped section 4a is made with a maximum corner-to-corner measurement d1 which exceeds the corresponding measurement d2 on the second nut-shaped section. The measurements d1 and d2 should be chosen with a relationship to each other such that the inner wall H' of a sleeve H, preferably in the form of a 12-sided sleeve, can pass over the second nut-shaped section 5a when the sleeve is brought up to co-act with the first nut-shaped section 4a via the end 2a of the coupling unit, i.e. the corner-to-corner measurement d2 should be less than the inscribed circle of the inner wall H'. The 12-sided sleeve tightening or sleeve loosening is well known in the prior art, and the diameter of the inscribed circle of its inner wall H' is indicated in the Figure by D. The play between the second nut-shaped section 5a and the inner wall H' is indicated by 15, and is preferably approximately 0.1 mm, calculated on the diameter and corner-to-corner measurement.

The material of the coupling parts 4 and 5 may be steel, brass or any suitable alloy. The construction shown makes possible an advantageous production process which is based on using a common hexagonal material for both the first and the second coupling parts. Apart from surface treatment the first nut-shaped section can be left unmachined and the external contour of the rest of the first coupling part can be produced by machining, as can its internal contours. The second nut-shaped section on the second coupling part is machined down over the corners to produce the under-dimensioning relative to the tightening or loosening sleeve H. The remaining part 5b of the second coupling part is machined down until the plane cylindrical surface is obtained.

The coupling unit can be finished to the state shown in FIG. 1. Here, the second coupling part 5 is resting against the snap-off rim 4d. The elasticity of the snap-off rim 4d can be exploited so that there is a sprung plate function for the second coupling part 5 which thus has a locked position relative to the first coupling part 4. In the state shown in FIG. 1 the coupling unit can be tightened in an actual object 3, and the unit is then ready for push-in connection of the end 1. Due to the construction described above, very reliable retention is obtained via the insertion part 6, and there is similarly reliable sealing by means of the seals 10 and 11. Moreover, the end is centered over the whole of its longitudinal extent inside the coupling unit, thanks to the combined guiding and centering unit 12. In the relative positions shown in FIG. 1 for the coupling parts 4 and 5, the sleeve 6 is attached loosely relative to the coupling part 5. This loose attachment enables a certain amount of rotation and longitudinal displacement to be carried out relative to the coupling parts 4 and 5. The movements of the sleeve 6 are restricted both by the tapered inner wall 5c on the second coupling part, and by the front parts of the sleeve-shaped section 4b on the first coupling part.

In the event that the requirements for retaining and sealing the end 1 are stringent, it is possible to change this attachment of the hose end, whereby it can move to a certain extent, so as to provide a rigid connection between the sleeve 6 and the coupling parts 4 and 5. In this case, the second coupling part is urged via the second nut-shaped section 5a so that the snap-off rim 4d is snapped off. The insertion sleeve 6 is also displaced longitudinally by the internal tapered surface 5c, until it rests against the front parts of the sleeve-shaped section 4b. At the same time the tapered shaping 5c on the relevant surface forces the spring elements 8 on the insertion sleeve 6 radially inwards, resulting in tighter clamping around the end involved. The operation of snapping-off the snap-off rim 4d is carried out when the end 1 is in position in the unit 2. From the above it will be seen that it is not expedient to use the second nut-shaped section 5a as a spanner grip for tightening the coupling unit 2 as a whole. The connecting device can be produced for $\frac{1}{4}''$-$\frac{5}{8}''$ hose or similar.

The invention is not restricted to the embodiment described above by way of example, but can be subjected to modifications within the framework of the following Patent Claims and the concept of the invention.

I claim:

1. An article comprising a coupling unit having a first coupling part and a second coupling part which can be displaced longitudinally relative thereto, said first coupling part comprising a first nut-shaped section and said second coupling part comprising a second nut-shaped section and an elongated cylindrical portion adjacent to said second nut-shaped section wherein said cylindrical portion and said second nut-shaped section are made of a single piece of steel, formed from a tube having a polygonal cross-section and wherein said second nut-shaped section has reduced corners and side surfaces connected to said corners, in parallel with the side walls of said first nut-shaped portion and wherein the number of said corners and said side surfaces of said second nut-shaped section is doubled relative to the number of corners and walls of said first nut-shaped section and wherein the second nut-shaped section is made with a cross-section measurement which allows the passage of the internal surface of a tightening and/or loosening sleeve over said second nut-shaped section and interaction of said tightening and/or loosening sleeve with said first nut-shaped section and wherein a gap formed between the internal surface of the tightening and/or loosening sleeve and said side surfaces of said second nut-shaped section does not exceed 0.1 mm.

2. An article according to claim 1, wherein said second nut-shaped section is located at the end of the second coupling part which will lie nearest to the first nut-shaped section.

3. An article according to claim 1, wherein the second nut-shaped section is constructed to allow the second coupling part to be tightened so that it rests against a snap-off rim located on the first coupling part.

4. An article according to claim 1, wherein the second nut-shaped section is constructed to allow the second coupling part to be tightened so that it rests against and snaps off a snap-off rim situated on the first coupling part.

5. An article according to claim 1, wherein the first nut-shaped section is constructed to allow the first coupling part to be tightened and/or loosened when the second coupling part is joined onto the first coupling part, this tightening and/or loosening being effected into or out of an object, respectively.

6. An article according to claim 2, wherein the first nut section is positioned on the central part of the first coupling part which has at its first end a sleeve-shaped section onto which the other coupling part can be joined and at its second end a screw thread for the attachment of the first coupling part.

7. An article according to claim 3, wherein, on the second nut-shaped section, the second coupling part has an internal recess, via which the second coupling part can co-act with said snap-off rim.

8. An article according to claim 1, wherein the second nut-shaped section is located on the second coupling part level with an internal screw thread by means of which the second coupling part can be screwed securely in a corresponding thread on the sleeve-shaped section of the first coupling part.

9. A method of simplifying the production of the article according to claim 1, said method comprising the step of forming said first nut-shaped section from said tube having said polygonal cross-section, machining down said tube to obtain said second nut-shaped section where the machining is carried out over the corners to produce under-dimensioning relative to the said tightening/loosening sleeve so as to obtain a gap between an internal wall surface of said sleeve and said side surfaces of said second nut-shaped section not exceeding 0.1 mm and the step of machining said sleeve portion of said second coupling element part to form a cylindrical external surface.

* * * * *